United States Patent
Jiang (10) Patent No.: US 11,452,030 B2
(45) Date of Patent: Sep. 20, 2022

(54) INFORMATION RECORDING METHOD AND INFORMATION RECORDING DEVICE

(71) Applicant: BEIJING XIAOMI MOBILE SOFTWARE CO., LTD., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 75 days.

(21) Appl. No.: 17/041,338

(22) PCT Filed: Mar. 26, 2018

(86) PCT No.: PCT/CN2018/080517
§ 371 (c)(1),
(2) Date: Sep. 24, 2020

(87) PCT Pub. No.: WO2019/183763
PCT Pub. Date: Oct. 3, 2019

(65) Prior Publication Data
US 2021/0092672 A1   Mar. 25, 2021

(51) Int. Cl.
*H04W 48/12* (2009.01)
*H04W 24/04* (2009.01)
*H04W 74/08* (2009.01)

(52) U.S. Cl.
CPC .......... *H04W 48/12* (2013.01); *H04W 24/04* (2013.01); *H04W 74/0833* (2013.01)

(58) Field of Classification Search
None
See application file for complete search history.

(56) References Cited

U.S. PATENT DOCUMENTS

| | | | |
|---|---|---|---|
| 2014/0057566 A1 | 2/2014 | Watfa et al. | |
| 2014/0241285 A1 | 8/2014 | Pang | |
| 2017/0295054 A1 | 10/2017 | Lee et al. | |
| 2018/0279377 A1* | 9/2018 | Lin | H04L 5/0055 |
| 2018/0317264 A1* | 11/2018 | Agiwal | H04W 74/085 |
| 2021/0345230 A1* | 11/2021 | Wei | H04W 72/0413 |

FOREIGN PATENT DOCUMENTS

| | | |
|---|---|---|
| CN | 102695189 A | 9/2012 |
| CN | 104272793 A | 1/2015 |
| CN | 104581777 A | 4/2015 |
| CN | 105934969 A | 9/2016 |
| CN | 106961712 A | 7/2017 |
| CN | 107223353 A | 9/2017 |

(Continued)

OTHER PUBLICATIONS

International Search Report to PCT Application No. PCT/CN2018/080517 dated Jan. 4, 2019 with English translation, (6p).

(Continued)

*Primary Examiner* — Hong S Cho
(74) *Attorney, Agent, or Firm* — Arch & Lake LLP (57) ABSTRACT

An information recording method is provided. In the method, the user equipment transmits a request to a base station, where the request is used for acquiring one or more system messages. The user equipment records information related to a request failure if one or more system messages are not acquired on the basis of the request.

17 Claims, 5 Drawing Sheets

(56) References Cited

FOREIGN PATENT DOCUMENTS

| | | |
|---|---|---|
| CN | 107580299 A | 1/2018 |
| CN | 107708205 A | 2/2018 |
| WO | 2008083580 A1 | 7/2008 |

OTHER PUBLICATIONS

NTT DOCOMO, Inc., "Broadcast Channel Coverage Optimisation", Discussion and Approval, 3GPP TSG-RAN2#78, RS-122539, Prague, Czech Republic, May 21-25, 2012, (2p).
3rd Generation Partnership Project, "Technical Specification Group Radio Access Network. Universal Terrestrial Radio Access (UTRA) and Evolved Universal Terrestrial Radio Access (E-UTRA); Radio Measurement Collection for Minimization of Drive Tests (MDT); Overall Description; Stage 2 (Release 14)" 3GPP TS37.320 V14.0.0, Mar. 31, 2017, (26p).
3rd Generation Partnership Project, "Technical Specification Group Radio Access Network; Evolved Universal Terrestrial Radio Access Network (E-UTRAN); X2 Application Protocol (X2AP) Release 15)" 3GPP TS36.423 V15.0.0, Dec. 31, 2017, (350p).
3GPP TS 36.321 V15.0.0 (Dec. 2017), 3rd Generation Partnership Project; Technical Specification Group Radio Access Network; Evolved Universal Terrestrial Radio Access (E-UTRA); Medium Access Control (MAC) protocol specification Release 15), (109p).
3GPP TS 36.331 V15.0.1 (Jan. 2018), 3rd Generation Partnership Project; Technical Specification Group Radio Access Network; Evolved Universal Terrestrial Radio Access (E-UTRA); Radio Resource Control (RRC) Protocol specification Release 15), (776p).
First Office Action of the Chinese application No. 201880000365.0, dated Dec. 15, 2021, (24 pages).

\* cited by examiner

INFORMATION RECORDING METHOD AND INFORMATION RECORDING DEVICE

CROSS-REFERENCES TO RELATED APPLICATION

This application is the U.S. national phase of PCT Patent Application No. PCT/CN2018/080517 filed on Mar. 26, 2018, the entire content of which is incorporated herein by reference for all purposes.

TECHNICAL FIELD

The present disclosure relates to the field of communication technology, and more particularly to a method and device for recording information, an electronic device and a computer readable storage medium.

BACKGROUND

The user equipment can perform minimized driving test (MDT) during operation and record minimized driving test information, and then transmit the minimized driving test information to the base station, for troubleshooting by the base station.

The user equipment in an idle state may request to establish a communication connection with the base station or recover the communication connection with the base station, and also request a system message from the base station. However, at present, the user equipment in the idle state records the minimized driving test information only when failing to establish a connection with the base station and failing to request recovering the connection with the base station, and does not record minimized driving test information when failing to request a system message from the base station.

This makes the base station be unable to accurately determine the reason why the user equipment fails to request the system message after receiving the minimized driving test information, which is not convenient for troubleshooting.

SUMMARY

In view of this, an objective of the present disclosure is to provide a method and device for recording information, an electronic device and a computer readable storage medium.

According to a first aspect of the embodiments of the present disclosure, a method for recording information is provided, which is applied to user equipment and includes the following operations.

A request is transmitted to a base station. The request is used to acquire one or more system messages.

Information related to a request failure is recorded in response to that one or more system messages are not acquired based on the request.

According to a second aspect of the embodiments of the present disclosure, an electronic device is provided, which is applied to user equipment and includes a processor and a memory for storing processor-executable instructions.

The processor is configured to execute the instructions to implement: transmitting a request to a base station, the request being used to acquire one or more system messages; and recording information related to a request failure in response to that one or more system messages are not acquired based on the request.

According to a third aspect of the embodiments of the present disclosure, a computer readable storage medium having stored thereon a computer program is provided, which is applied to user equipment. The computer program, when being executed, implements the operations of the method for recording information described above.

BRIEF DESCRIPTION OF THE DRAWINGS

In order to describe the technical solutions in the embodiments of the present disclosure more clearly, the accompanying drawings required to be used for descriptions about the embodiments will be simply introduced below. It is apparent that the accompanying drawings described below only illustrate some embodiments of the present disclosure. Those skilled in the art may further obtain other accompanying drawings according to these accompanying drawings without creative work.

DETAILED DESCRIPTION

The technical solutions in the embodiments of the present disclosure will be described clearly and completely below in combination with the accompanying drawings in the embodiments of the present disclosure. It is apparent that the described embodiments are a part rather than all embodiments of the present disclosure. All other embodiments obtained by those skilled in the art based on the embodiments in the present disclosure without creative work shall fall within the scope of protection of the disclosure.

Figure 1:
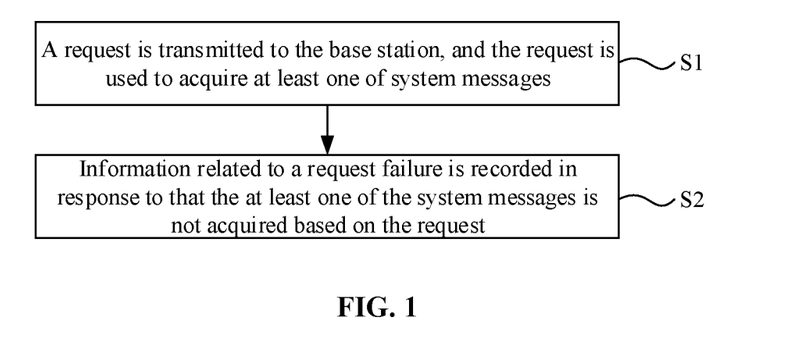
FIG. 1 is a schematic flowchart of a method for recording information according to an embodiment of the present disclosure.

FIG. 1 is a schematic flowchart of a method for recording information according to an embodiment of the present disclosure. The method for recording information shown in the embodiment may be applied to user equipment, such as mobile phones and tablet computers. The user may adopt the long term evolution (LTE) or new radio (NR) for communication.

As shown in FIG. 1, the method for recording information includes the following operations by the user equipment.

At S1, a request is transmitted to the base station, and the request is used to acquire one or more system messages.

In an embodiment, the base station and the user equipment may adopt LTE, or may use NR.

In an embodiment, the user equipment may transmit a request to the base station when the user equipment is in an idle state, or may transmit a request to the base station when the user equipment is in an inactive state.

In an embodiment, each system message may include one or more system message blocks (SIB). The request may include one sub-request or multiple sub-requests. If the request includes one sub-request, the one sub-request may be used to acquire one system message, or the one sub-request may be used to acquire multiple system message. If the request includes multiple sub-requests, the multiple sub-requests may be used to acquire multiple system messages, and sub-requests have one-to-one correspondences to the system messages.

At S2, information related to a request failure is recorded in response to that one or more system messages are not acquired based on the request.

In an embodiment, the request may be transmitted to the base station by a first message of a random access request, or a third message of the random access request, or by other methods as needed. For example, taking a case that the user equipment transmits the request which is carried in the first message of random access to the base station as an example, if the number of transmitting the first message of the random access to the base station by the user equipment reaches a preset number while the user equipment does not receive feedback from the base station, it may be determined that the system message is not acquired based on the request.

In an embodiment, the request may be used to acquire one or more system messages. For example, the request is only used to acquire a system message A, and when the system message A is not acquired based on the request, information related to a request failure is recorded. For example, the request is used to acquire system message B, system message C and system message D, and when any one of system message B, system message C and system message D is not acquired based on the request, the information related to the request failure is recorded.

In an embodiment, information related to the request failure may be recorded in a record of minimized driving test information. It should be noted that the information related to the request failure refers to information recorded when the user equipment determines that one or more system messages are not acquired based on the request, for example, information of a cell where the user equipment is located, information of a neighboring cell of the cell where the user equipment is located, location information of the user equipment, and information about system messages requested by the user equipment.

The user equipment may record the information related to the request failure when the user equipment fails to request a system message, and transmit the recorded information related to the request failure to the base station when establishing or recovering a communication connection with the base station. The base station can determine the reason why the user equipment fails to request the system message, and further perform troubleshooting.

For example, the information related to the request failure recorded when the user equipment fails to request the system message of the base station may include information about a cell where the user equipment is located, signal quality of the cell where the user equipment is located, and signal quality of a neighboring cell of the cell where the user equipment is located. Based on the information related to the request failure, the base station can easily determine the reason why the user equipment fails to request the system message (for example, the signal quality of the cell where the user equipment is located is low), for facilitating accurate troubleshooting of the base station.

Figure 2:
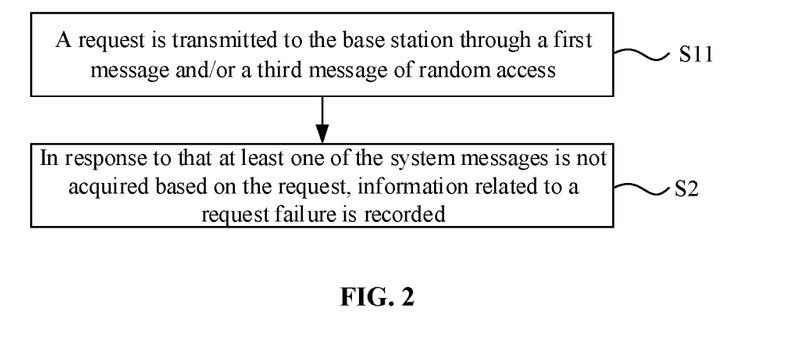
FIG. 2 is another schematic flowchart of a method for recording information according to an embodiment of the present disclosure.

FIG. 2 is another schematic flowchart of a method for recording information according to an embodiment of the present disclosure. As shown in FIG. 2, based on the embodiment shown in FIG. 1, the operation that the request is transmitted to the base station includes operations as follows.

At S11, a request is transmitted to the base station through a first message and/or a third message of random access.

The information related to the request failure contains type information of the request which is used to indicate that the request is contained in the first message and/or in the third message.

In an embodiment, the user equipment may transmit the request which is carried in the first message of random access request to the base station, or transmit the request which is carried in the third message of the random access request to the base station, or transmit the request with other methods as needed to the base station.

If the user equipment transmits the request which is carried in the first message of the random access request to the base station, the request may be carried by a preamble in the first message of the random access request. For example, a value of a preset bit in the preamble is set, and the base station can determine the system message requested by the user equipment according to the value of the preset bit upon receiving the preamble. If the base station transmits the request which is carried in the third message of the random access request to the base station, the request may be carried by a bitmap in the third message of the random access request. For example, a value of a preset position in the bitmap may be set, and the base station can determine the system message requested by the user equipment according to the value of the preset position upon receiving the bitmap.

In an embodiment, the type information is used to indicate that the request is contained in the first message and/or the third message. Upon receiving the information related to the request failure, the base station can determine that the request of the user equipment for acquiring the system information through the first message of random access is failed or the request of the user equipment for acquiring the system information through the third message of random access is failed according to the type information in the information related to the request failure, so that the base station can accurately determine the reason why the user equipment fails to request the system message, and further perform troubleshooting.

Optionally, the information related to the request failure contains information related to the system message.

In an embodiment, the information related to the system message may be used to indicate the system message requested by the user equipment. For example, the user equipment may request system message A, system message B, system message C and system message D of the base station, and the information related to the system message may be identifiers of the above four system messages. Based on this, after receiving the information related to the request failure, the base station can determine the system message, the request of the user equipment for which is failed, based on the related information of the system message, for facilitating accurate troubleshooting of the base station.

Optionally, the information related to the request failure contains purpose information of the request. The purpose information of the request is used to indicate whether the request is used to request a system message, and/or request to establish a communication connection with the base station, and/or request to recover the communication connection with the base station.

In an embodiment, multiple types of request operation may be initiated by the user equipment to the base station, and each type of request may be failed. For example, the request for a system message of the base station may be failed, the request for establishing a communication connection with the base station may be failed, and the request for recovering the communication connection with the base station may be failed. Therefore, the purpose information of the request is set in the information related to the request failure, and upon receiving the information related to the request failure, the base station can determine a request operation which the user equipment fails to perform according to the purpose information of the request, for facilitating accurately determining the reason why the request made by the user equipment is failed by the base station.

Optionally, the information related to the request failure contains location information of the user equipment.

In an embodiment, since the information related to the request failure contains the location information of the user equipment, and upon receiving the information related to the request failure, the base station may learn a location of the user equipment when the user equipment determines that one or more system messages are not acquired based on the request. The base station can analyze the reason (for example, whether the user equipment is in the service area is determined based on the location information of the user equipment) why the user equipment fails to request the system message according to the location of the user equipment, for facilitating troubleshooting.

Optionally, the information related to the request failure contains speed information of the user equipment.

In an embodiment, since the information related to the request failure contains the speed information of the user equipment, and upon receiving the information related to the request failure, the base station may learn a speed of the user equipment when the user equipment determines that one or more system messages are not acquired based on the request. The base station can analyze the reason (for example, whether the user equipment is moving at a high speed, for example in a high-speed railway, may be determined based on the speed information of the user equipment) why the user equipment fails to request the system message according to the speed of the user equipment, for facilitating troubleshooting.

Optionally, the information related to the request failure contains time information of the user equipment.

In an embodiment, since the information related to the request failure contains the time information of the user equipment, and upon receiving the information related to the request failure, the base station may learn time on the user equipment when the user equipment determines that one or more system messages are not acquired based on the request.

The base station can analyze the reason (for example, whether the base station is in operation time when the user equipment transmits the request may be determined according to the time information of the user equipment) why the user equipment fails to request the system message according to the time on the user equipment, for facilitating troubleshooting.

Optionally, the information related to the request failure contains information, for example a cell identifier, of a cell of where the user equipment is located.

In an embodiment, since the information related to the request failure contains the information of the cell where the user equipment is located, and upon receiving the information related to the request failure, the base station can learn a cell where the user equipment is located when the user equipment determines that one or more system messages are not acquired based on the request. The base station can analyze the reason (for example, whether there is a problem in the cell where the user equipment is located when the user equipment transmits the request is determined based on the information of the cell where the user equipment is located) why the user equipment fails to request the system message according to the information of the cell where the user equipment is located, for facilitating troubleshooting.

Optionally, the information related to the request failure contains information of signal quality of the cell where the user equipment is located.

In an embodiment, since the information related to the request failure contains information of signal quality of the cell where the user equipment is located, and upon receiving the information related to the request failure, the base station may learn signal quality (such as receiving power of a reflected signal (RSRP) and receiving quality of a reflected signal (RSRQ)) of the cell where the user equipment is located when the user equipment determines that one or more system messages are not acquired based on the request. The base station can analyze the reason (for example, whether the signal quality of the cell where the user equipment is located is too low is determined according to the information of the signal quality of the cell where the user equipment is located) why the user equipment fails to request the system message according to the information of the signal quality of the cell where the user equipment is located, for facilitating troubleshooting.

Optionally, the information related to the request failure contains information of signal quality of a neighboring cell of the cell where the user equipment is located.

In an embodiment, since the information related to the request failure contains information of signal quality of a neighboring cell of the cell where the user equipment is located, and upon receiving the information related to the request failure, the base station may learn signal quality (such as RSRP and RSRQ) of a neighboring cell of the cell where the user equipment is located when the user equipment determines that one or more system messages are not acquired based on the request. The base station can analyze the reason (for example, whether the signal quality of the neighboring cell of the cell where the user equipment is located is too high, which may results in that the user equipment cannot stably access into the cell where the user equipment is located, is determined according to information of signal quality of a neighboring cell of the cell where the user equipment is located) why the user equipment fails to request the system message according to the information of the signal quality of the neighboring cell of the cell where the user equipment is located, for facilitating troubleshooting.

Optionally, the information related to the request failure contains power information. The power information is used to indicate whether the user equipment reaches maximum transmit power.

In an embodiment, since the information related to the request failure contains power information for indicating whether the user equipment reaches maximum transmit power, and upon receiving the information related to the request failure, the base station may learn whether the user equipment reaches the maximum transmit power when the user equipment determines that one or more system messages are not acquired based on the request. The base station can analyze the reason (for example, whether the user equipment reaches the maximum transmit power is determined according to the power information, and it is determined that the transmit power is too low if the user equipment does not reach the maximum transmit power) why the user equipment fails to request the system message according to the power information, for facilitating troubleshooting.

Optionally, the information related to the request failure contains competition information. The competition information is used to indicate whether there is other user equipment which competes with the user equipment to access the base station.

In an embodiment, since the information related to the request failure contains the competition information for indicating whether there is other user equipment which competes with the user equipment to access the base station, and upon receiving the information related to the request failure, the base station may learn whether there is other user equipment which competes with the user equipment to access the base station when the user equipment determines that one or more system messages are not acquired based on the request. The base station can analyze the reason (for example, whether the user equipment fails to request the system information due to failing to access the base station in competition with other user equipment is determined according to the competition information) why the user equipment fails to request the system message according to the competition information, for facilitating troubleshooting.

Figure 3:
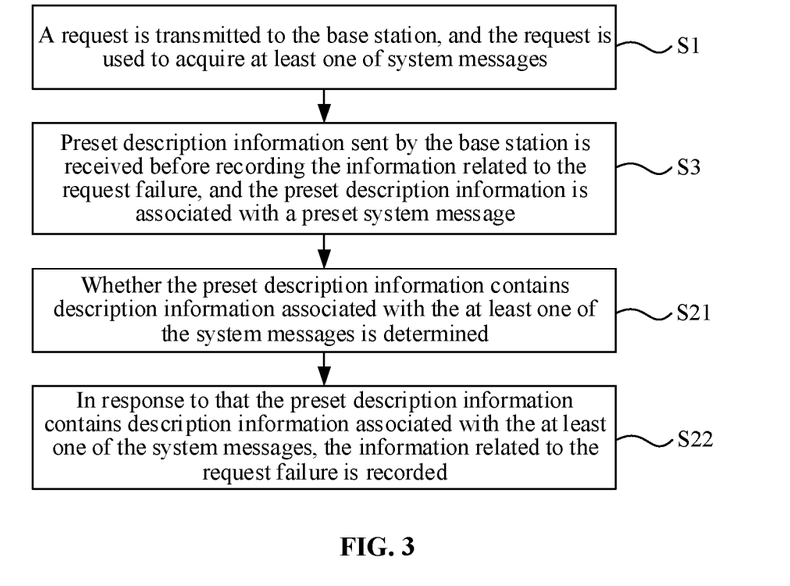
FIG. 3 is another schematic flowchart of a method for recording information according to an embodiment of the present disclosure.

FIG. 3 is another schematic flowchart of a method for recording information according to an embodiment of the present disclosure. As shown in FIG. 3, based on the embodiment shown in FIG. 1, the method for recording information further includes the following operation.

At S3, preset description information transmitted by the base station is received before recording the information related to the request failure. The preset description information is associated with a preset system message.

The operation that the information related to the request failure is recorded in response to that one or more system messages are not acquired based on the request includes the following operations.

At S21, whether the preset description information contains description information associated with the one or more system messages are determined.

At S22, in response to that the preset description information contains description information associated with the one or more system messages, the information related to the request failure is recorded.

In an embodiment, the base station may transmit description information associated with the preset system message to the user equipment. The preset system message may be selected as needed, and the description information may be an identifier of the preset system message or may be description information for describing the preset system message in other ways.

In an embodiment, after receiving the preset description information, the user equipment may determine whether description information of the requested one or more system messages from the base station is included in the preset description information, and record information related to the request failure in response to that the description information associated with the at least one of the requested system messages is included in the preset description information.

According to the above description, the base station may transmit the preset description information to the user equipment, to instruct the user equipment to record the information related to the request failure only when the requested system message contains the preset system message, so as to ensure that the recording operation is controllable and targeted.

Figure 4:
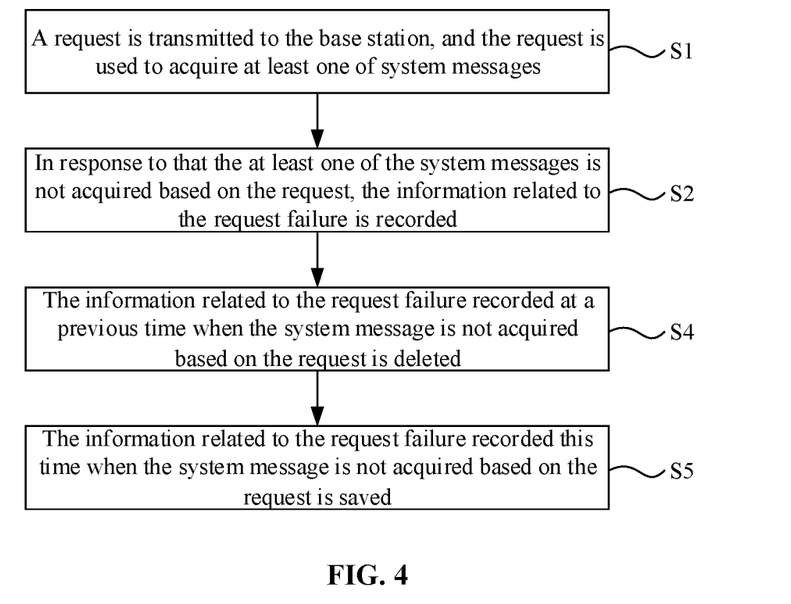
FIG. 4 is another schematic flowchart of a method for recording information according to an embodiment of the present disclosure.

FIG. 4 is another schematic flowchart of a method for recording information according to an embodiment of the present disclosure. As shown in FIG. 4, based on the embodiment shown in FIG. 1, the method for recording information further includes the following operations.

At S4, the information related to the request failure recorded at a previous time when the system message is not acquired based on the request is deleted;

At S5, the information related to the request failure recorded this time when the system message is not acquired based on the request is saved;

In an embodiment, the user equipment may delete the information related to the request failure recorded at the previous time when the system message is not acquired based on the request each time when recording the information related to the request failure, thereby ensuring that the latest information related to the request failure is stored and reducing the storage space.

Figure 5:
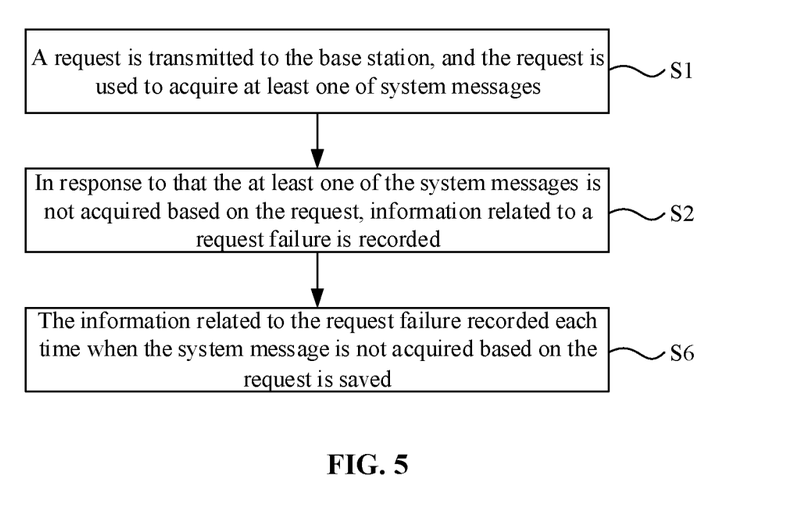
FIG. 5 is another schematic flowchart of a method for recording information according to an embodiment of the present disclosure.

FIG. 5 is another schematic flowchart of a method for recording information according to an embodiment of the present disclosure. As shown in FIG. 5, based on the embodiment shown in FIG. 1, the method for recording information further includes the following operation.

At S6, the information related to the request failure recorded each time when the system message is not acquired based on the request is saved.

In an embodiment, the user equipment may save the information related to the request failure recoded each time when the system message is not acquired based on the request, and perform statistical analysis (the statistical analysis operation may be performed by the user equipment, or may be performed by the base station after the user equipment transmits the saved information to the base station) based on the saved information, to determine the reason for request failure of the user equipment more accurately (for example, the statistical analysis operation is performed by the user equipment, and the user equipment may transmit the reason for request failure to the base station after determining the reason according to the statistical analysis operation).

Figure 6:
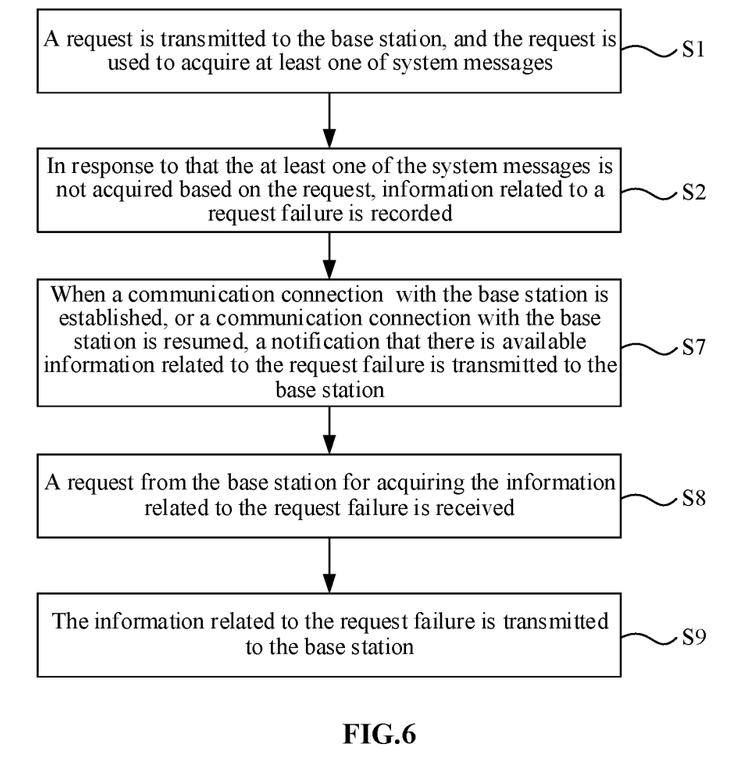
FIG. 6 is another schematic flowchart of a method for recording information according to an embodiment of the present disclosure.

FIG. 6 is another schematic flowchart of a method for recording information according to an embodiment of the present disclosure. As shown in FIG. 6, based on the embodiment shown in FIG. 1, the method for recording information further includes the following operations.

At S7, when establishing a communication connection with the base station, or resuming a communication connection with the base station, a notification that there is available information related to the request failure is transmitted to the base station.

At S8, a request from the base station for acquiring the information related to the request failure is received.

At S9, the information related to the request failure is transmitted to the base station.

In an embodiment, after recording the information related to the request failure (for example, the number of recording the information related to the request failure by the user equipment reaches a preset number), the user equipment may transmit a notification to the base station when establishing or recovering a communication connection with the base station, to notify the base station that the user equipment has recorded the information related to the request failure.

When the base station needs to acquire the information related to the request failure recorded by the user equipment, the base station may transmit a request for acquiring the information related to the request failure to the user equipment. The user equipment may transmit the recorded information related to the request failure to the base station, and the base station can analyze the reason why the user equipment fails to request the system message according to the information related to the request failure, for facilitating troubleshooting of the base station.

Optionally, the notification is used to indicate that the information related to the request failure contains information of the system message which is not acquired based on the request.

In an embodiment, in the notification sent by the user equipment to the base station, the user equipment may explicitly indicate by the notification that the information related to the request failure contains information of the system message which is not acquired based on the request. The base station can quickly analyze the reason why the user equipment fails to request the system message according to the information related to the request failure.

Optionally, the notification is used to indicate that the information related to the request failure contains information of a message which is not acquired based on the request.

In an embodiment, in the notification sent by the user equipment to the base station, the user equipment may, through the notification, only indicate that the information related to the request failure contains information of the message which is not acquired based on the request, and does not indicate a request operation of the user equipment which is failed. After receiving the notification, the base station may determine the request operation of the user equipment which is failed according to historical request records of the user equipment. Based on this, the amount of data in the notification sent by the user equipment to the base station can be reduced.

Optionally, the information related to the request failure is contained in the minimized driving test information.

In an embodiment, when determining that one or more system messages are not acquired based on the request, the user equipment may perform minimized driving test and record minimized driving test information. The recorded minimized driving test information may contain information related to the request failure.

Corresponding to the foregoing embodiments of the method for recording information, a device for recording information is also provided in the present disclosure.

Figure 7:
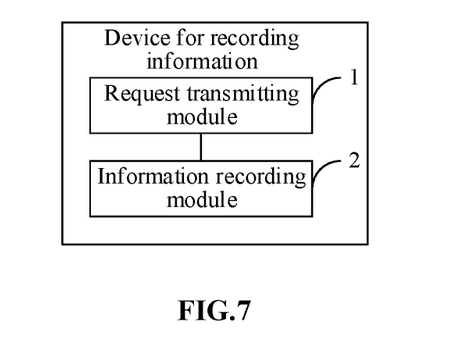
FIG. 7 is a schematic diagram of a device for recording information according to an embodiment of the present disclosure.

FIG. 7 is a schematic diagram of a device for recording information according to an embodiment of the present disclosure. The device for recording information shown in the embodiment may be applied to user equipment, such as mobile phones and tablet computers. The user may adopt the LTE or the NR for communication.

As shown in FIG. 7, the device for recording information includes a request transmitting module 1 and an information recording module 2.

The request transmitting module 1 is configured to transmit a request to the base station. The request is used to acquire one or more system messages.

The information recording module 2 is configured to record information related to a request failure in response to that one or more system messages are not acquired based on the request.

Optionally, the request transmitting module is configured to transmit a request to the base station through a first message and/or a third message of random access;

The information related to the request failure contains type information of the request, and the type information is used to indicate that the request is contained in the first message and/or in the third message.

Optionally, the information related to the request failure contains information related to the system message.

Optionally, the information related to the request failure contains purpose information of the request, and the purpose information is used to indicate that the request is used to request the system message, and/or request to establish a communication connection with the base station, and/or request to recover the communication connection with the base station.

Optionally, the information related to the request failure contains location information of the user equipment.

Optionally, the information related to the request failure contains speed information of the user equipment.

Optionally, the information related to the request failure contains time information of the user equipment.

Optionally, the information related to the request failure contains information of a cell where the user equipment is located.

Optionally, the information related to the request failure contains information of signal quality of the cell where the user equipment is located.

Optionally, the information related to the request failure contains information of signal quality of a neighboring cell of the cell where the user equipment is located.

Optionally, the information related to the request failure contains power information. The power information is used to indicate whether the user equipment reaches maximum transmit power.

Optionally, the information related to the request failure contains competition information. The competition information is used to indicate whether there is other user equipment which competes with the user equipment to access the base station.

Figure 8:
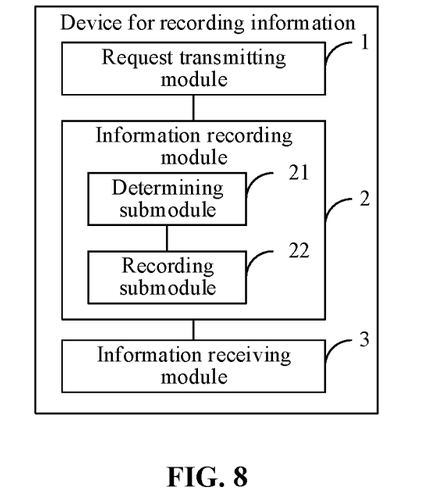
FIG. 8 is another schematic diagram of a device for recording information according to an embodiment of the present disclosure.

FIG. 8 is another schematic diagram of a device for recording information according to an embodiment of the present disclosure. As shown in FIG. 8, based on the embodiment shown in FIG. 7, the device for recording information further includes an information receiving module 3.

The information receiving module is configured to receive preset description information transmitted by the base station before the information recording module records the information related to the request failure. The preset description information is associated with a preset system message.

The information recording module 2 includes a determining submodule 21 and a recording submodule 22.

The determining submodule 21 is configured to determine whether the preset description information contains description information associated with the one or more system messages.

The recording submodule 22 is configured to record the information related to the request failure if the preset description information contains description information associated with the one or more system messages.

Figure 9:
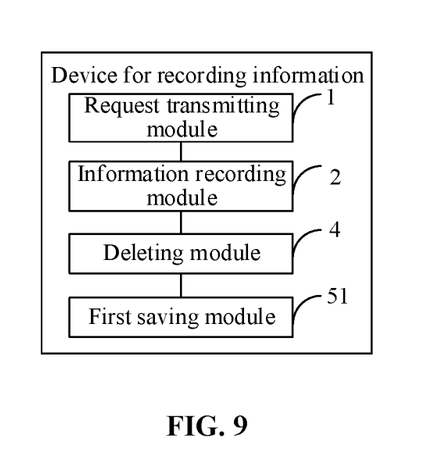
FIG. 9 is another schematic diagram of a device for recording information according to an embodiment of the present disclosure.

FIG. 9 is another schematic diagram of a device for recording information according to an embodiment of the present disclosure. As shown in FIG. 9, based on the embodiment shown in FIG. 7, the device for recording information further includes a deleting module 4 and a first saving module 51.

The deleting module 4 is configured to delete the information about the request failure recorded at a previous time when the system message is not acquired based on the request.

The first saving module 51 is configured to save the information about the request failure recorded this time when the system message is not acquired based on the request.

Figure 10:
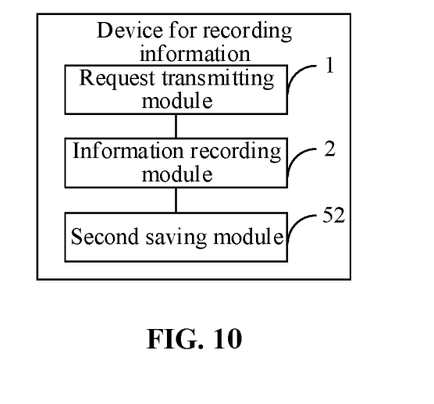
FIG. 10 is another schematic diagram of a device for recording information according to an embodiment of the present disclosure.

FIG. 10 is another schematic diagram of a device for recording information according to an embodiment of the present disclosure. As shown in FIG. 10, based on the embodiment shown in FIG. 7, the device for recording information further includes a second saving module 52.

The second saving module 52 is configured to save the information related to the request failure recorded each time when the system message is not acquired based on the request.

Figure 11:
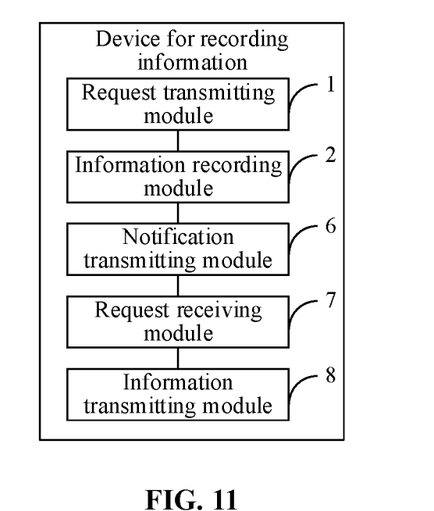
FIG. 11 is another schematic diagram of a device for recording information according to an embodiment of the present disclosure.

FIG. 11 is another schematic diagram of a device for recording information according to an embodiment of the present disclosure. As shown in FIG. 11, based on the embodiment shown in FIG. 7, the device for recording information further includes a notification transmitting module 6, a request receiving module 7 and an information transmitting module 8.

The notification transmitting module 6 is configured to transmit a notification that there is available information related to the request failure to the base station when establishing a communication connection with the base station or recovering a communication connection with the base station.

The request receiving module 7 is configured to receive a request from the base station for acquiring the information related to the request failure.

The information transmitting module 8 is configured to transmit the information related to the request failure to the base station.

Optionally, the notification is used to indicate that the information related to the request failure contains information of the system message which is not acquired based on the request.

Optionally, the notification is used to indicate that the information related to the request failure contains information of a message which is not acquired based on the request.

Optionally, the information related to the request failure is contained in minimized driving test information.

With regard to the device in the above embodiment, the specific manner in which each module performs the operation has been described in detail in the related method embodiments, and details are not described here.

For the device embodiment, since the device embodiment basically corresponds to the method embodiment, the relevant part can be referred to the description of the method embodiment. The device embodiments described above are only schematic. The modules described as separate components may or may not be physically separated, and the components displayed as modules may or may not be physical units, that is, may be located in the same place, or may be distributed to multiple network elements. A part or all of the modules may be selected according to actual needs to achieve the purpose of the solution of this embodiment. Those of ordinary skill in the art can understand and implement the modules without paying creative labor.

An electronic device is further provided according to an embodiment of the present disclosure, which is applied to user equipment and includes a processor and a memory for storing processor-executable instructions.

The processor is configured to transmit a request to the base station, the request is used to acquire one or more system messages; and record information related to a request failure in response to that one or more system messages are not acquired based on the request.

A computer readable storage medium having stored thereon a computer program is further provided according to an embodiment of the present disclosure, which is applied to user equipment. The computer program, when being executed, implements the following operations.

A request is transmitted to the base station. The request is used to acquire one or more system messages.

Information related to a request failure is recorded in response to that one or more system messages are not acquired based on the request.

Figure 12:
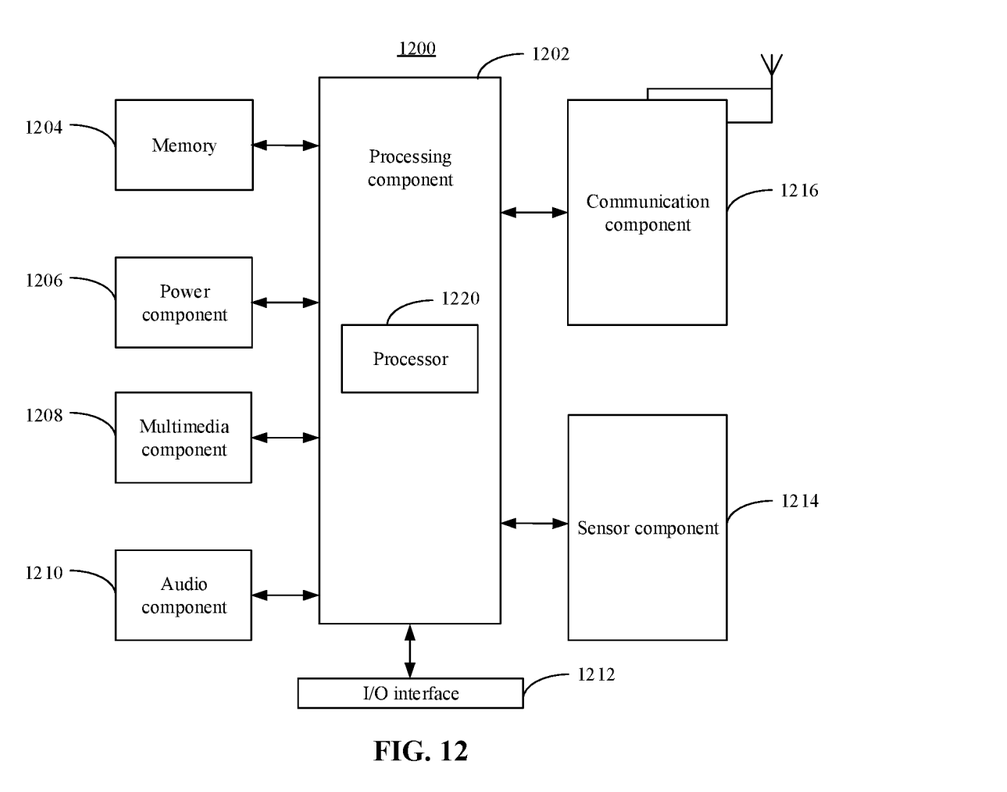
FIG. 12 is a schematic block diagram of a device for recording information according to an exemplary embodiment.

FIG. 12 is a schematic block diagram of a device 1200 for recording information according to an exemplary embodiment. For example, the device 1200 may be a mobile phone, a computer, a digital broadcasting terminal, a messaging device, a game console, a tablet device, a medical device, a fitness device and a personal digital assistant and the like.

Referring to FIG. 12, the device 1200 may include one or more of the following components: a processing component 1202, a memory 1204, a power component 1206, a multimedia component 1208, an audio component 1210, an Input/output (I/O) interface 1212, a sensor component 1214 and a communication component 1216.

The processing component 1202 is configured to control overall operations of the device 1200, such as the operations associated with display, telephone calls, data communications, camera operations and recording operations. The processing component 1202 may include one or more processors 1220 to execute instructions to perform all or a part of the operations in the abovementioned method. Moreover, the processing component 1202 may include one or more modules which facilitate interaction between the processing component 1202 and other components. For instance, the processing component 1202 may include a multimedia module to facilitate interaction between the multimedia component 1208 and the processing component 1202.

The memory 1204 is configured to store various types of data to support the operation of the device 1200. Examples of such data include instructions for any application programs or methods operated on the device 1200, contact data, phonebook data, messages, pictures, video or the like. The memory 1204 may be implemented by any type of volatile or non-volatile memory devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, and a magnetic or optical disk.

The power component 1206 is configured to provide power for various components of the device 1200. The power component 1206 may include a power management system, one or more power supplies, and other components associated with generation, management and distribution of power for the device 1200.

The multimedia component 1208 includes a screen for providing an output interface between the device 1200 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action but also detect a duration and pressure associated with the touch or swipe action. In some examples, the multimedia component 1208 may include a front camera and/or a rear camera. The front camera and/or the rear camera may receive external multimedia data when the device 1200 is in an operation mode, such as a photographing mode or a video mode. Each of the front camera and the rear camera may be a fixed optical lens system or have focusing and optical zooming capabilities.

The audio component 1210 is configured to output and/or input an audio signal. For example, the audio component 1210 includes a Microphone (MIC), and the MIC is configured to receive an external audio signal when the device 1200 is in the operation mode, such as a call mode, a recording mode and a voice recognition mode. The received audio signal may further be stored in the memory 1204 or transmitted through the communication component 1216. In some embodiments, the audio component 1210 may include a speaker for outputting audio signals.

The I/O interface 1212 is configured to provide an interface between the processing component 1202 and a peripheral interface module, and the peripheral interface module may be a keyboard, a click wheel, a button and the like. The button may include, but be not limited to: a home button, a volume button, a starting button and a locking button.

The sensor component 1214 may include one or more sensors configured to provide status assessment in various aspects for the device 1200. For instance, the sensor component 1214 may detect an on/off status of the device 1200 and relative positioning of components, such as a display and small keyboard of the device 1200, and the sensor component 1214 may further detect a change in a position of the device 1200 or a component of the device 1200, presence or absence of contact between the user and the device 1200, orientation or acceleration/deceleration of the device 1200 and a change in temperature of the device 1200. The sensor component 1214 may include a proximity sensor configured to detect presence of an object nearby without any physical contact. The sensor component 1214 may also include a light sensor, such as a Complementary Metal Oxide Semiconductor (CMOS) or Charge Coupled Device (CCD) image sensor, configured for use in an imaging APP. In some embodiments, the sensor component 1214 may also include an acceleration sensor, a gyroscope sensor, a magnetic sensor, a pressure sensor or a temperature sensor.

The communication component 1216 is configured to facilitate wired or wireless communication between the device 1200 and other equipment. The device 1200 may access a communication-standard-based wireless network, such as a Wireless Fidelity (Wi-Fi) network, a 2nd-Generation (2G), 3rd-Generation (3G) or a combination thereof. In an exemplary embodiment, the communication component 1216 is configured to receive a broadcast signal or broadcast associated information from an external broadcast management system through a broadcast channel. In an exemplary embodiment, the communication component 1216 may further include a Near Field Communication (NFC) module to facilitate short-range communication. For example, the NFC module may be implemented based on a Radio Frequency Identification (RFID) technology, an Infrared Data Association (IrDA) technology, an Ultra-WideBand (UWB) technology, a Bluetooth (BT) technology and another technology.

In an exemplary embodiment, the device 1200 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method.

In an exemplary embodiment, a non-transitory computer-readable storage medium including instructions is further provided, such as the memory 1204 including instructions. The instructions can be executed by the processor 1220 of the device 1200 to implement the abovementioned method. For example, the non-transitory computer-readable storage medium may be a read-only memory (ROM), a random access memory (RAM), a Compact Disc Read-Only Memory (CD-ROM), a magnetic tape, a floppy disc, an optical data storage device and the like.

Other implementation solutions of the present disclosure will be apparent to those skilled in the art from consideration of the specification and practice of the present disclosure. The present disclosure is intended to cover any variations, uses, or adaptations of the present disclosure conforming to the general principles thereof and including such departures from the present disclosure as come within known or customary practice in the art. The specification and embodiments are exemplary, and a true scope and spirit of the present disclosure are indicated by the following claims.

It will be appreciated that the present disclosure is not limited to the exact construction that has been described above and illustrated in the accompanying drawings, and that various modifications and changes may be made without departing from the scope of the present disclosure. It is intended that the scope of the present disclosure is only limited by the appended claims.

It is to be noted that relational terms "first", "second" and the like in the present disclosure are adopted only to distinguish one entity or operation from another entity or operation and not always to require or imply existence of any such practical relationship or sequence between these entities or operations. Terms "include" and "have" or any other variation thereof is intended to cover nonexclusive inclusions, so that a process, method, object or device including a series of elements not only includes those elements, but also includes other elements that are not clearly listed, or further includes elements intrinsic to the process, the method, the object or the device. Under the condition of no more limitations, an element defined by statement "including a/an" does not exclude existence of another element that is the same in a process, method, object or device including the element.

The method and device provided in the embodiments of the present disclosure are introduced above in detail. The principle and implementation modes of the present disclosure are elaborated in the specification with specific examples. The embodiments are described above only to help understanding for the method of the present disclosure and the core concept thereof. In addition, those of ordinary skill in the art may make variations to the specific implementation modes and the scope of application according to the concept of the present disclosure. To sum up, the contents of the specification should not be understood as limits to the present disclosure.

The invention claimed is:

1. A method for recording information, applied to user equipment, and comprising:
    transmitting a request to a base station, wherein the request is used to acquire one or more system messages; and
    recording information related to a request failure in response to that the one or more system messages are not acquired based on the request,
    wherein transmitting the request to the base station comprises:
    transmitting the request to the base station through at least one of a first message or a third message of random access,
    wherein the information related to the request failure comprises type information of the request, and the type information indicates that the request is contained in at least one of the first message or the third message.

2. The method of claim 1, wherein the information related to the request failure contains one of information as follows:
    information related to the system messages;
    purpose information of the request, wherein the purpose information indicates at least one of cases that the request is used to request the system message, the request is used to request to establish a communication connection with the base station, or the request is used to request to recover the communication connection with the base station;
    location information of the user equipment;
    speed information of the user equipment;
    time information of the user equipment;
    information of a cell where the user equipment is located;
    information of signal quality of a cell where the user equipment is located;
    information of signal quality of a neighboring cell of a cell where the user equipment is located;
    power information, wherein the power information indicates whether the user equipment reaches maximum transmit power; or
    competition information, wherein the competition information indicates whether there is other user equipment which competes with the user equipment to access the base station.

3. The method of claim 1, further comprising:
    receiving preset description information transmitted by the base station before the recording the information related to the request failure, wherein the preset description information is associated with a preset system message;
    wherein the recording the information related to the request failure in response to that the one or more system messages are not acquired based on the request comprises:
    determining whether the preset description information contains description information associated with the one or more system messages; and
    recording the information related to the request failure in response to that the preset description information contains the description information associated with the one or more system messages.

4. The method of claim 1, further comprising:
    deleting information related to a request failure recorded at a previous time when the system message is not acquired based on the request; and
    saving information related to a request failure recorded this time when the system message is not acquired based on the request.

5. The method of claim 1, further comprising:
    saving information related to a request failure recorded each time when the system message is not acquired based on the request.

6. The method of claim 1, further comprising:
    transmitting a notification that there is available information related to the request failure to the base station when establishing a communication connection with the base station or recovering the communication connection with the base station;
    receiving a request from the base station for acquiring the information related to the request failure; and
    transmitting the information related to the request failure to the base station.

7. The method of claim 6, wherein the notification indicates that the information related to the request failure contains information of the system message which is not acquired based on the request, or the notification indicates that the information related to the request failure contains information of a message which is not acquired based on the request.

8. The method of claim 1, wherein the information related to the request failure is contained in minimized driving test information.

9. An electronic device, applied to user equipment, and comprising:
    a processor; and
    a memory for storing processor-executable instructions;
    wherein the processor is configured to execute the instructions to implement:
    transmitting a request to a base station, wherein the request is used to acquire one or more system messages; and
    recording information related to a request failure in response to that the one or more system messages are not acquired based on the request,
    wherein the processor is configured to execute the instructions to implement:
    transmitting the request to the base station through at least one of a first message or a third message of random access,
    wherein the information related to the request failure contains type information of the request, and the type information indicates that the request is contained in at least one of the first message or the third message.

10. The electronic device of claim 9, wherein the information related to the request failure contains one of information as follows:
    information related to the system messages;
    purpose information of the request, wherein the purpose information indicates at least one of cases that the request is used to request the system message, the request is used to request to establish a communication connection with the base station, or the request is used to request to recover the communication connection with the base station;
    location information of the user equipment;
    speed information of the user equipment;
    time information of the user equipment;
    information of a cell where the user equipment is located;

information of signal quality of a cell where the user equipment is located;

information of signal quality of a neighboring cell of a cell where the user equipment is located;

power information, wherein the power information indicates whether the user equipment reaches maximum transmit power; or competition information, wherein the competition information indicates whether there is other user equipment which competes with the user equipment to access the base station.

11. The electronic device of claim 9, wherein the processor is configured to execute the instructions to implement:

receiving preset description information transmitted by the base station before the recording the information related to the request failure, wherein the preset description information is associated with a preset system message;

wherein the processor is configured to execute the instructions to implement:

determining whether the preset description information contains description information associated with the one or more system messages; and recording the information related to the request failure in response to that the preset description information contains the description information associated with the one or more system messages.

12. The electronic device of claim 9, wherein the processor is configured to execute the instructions to implement:

deleting information related to a request failure recorded at a previous time when the system message is not acquired based on the request; and saving information related to a request failure recorded this time when the system message is not acquired based on the request.

13. The electronic device of claim 9, wherein the processor is configured to execute the instructions to implement:

saving information related to a request failure recorded each time when the system message is not acquired based on the request.

14. The electronic device of claim 9, wherein the processor is configured to execute the instructions to implement:

transmitting a notification that there is available information related to the request failure to the base station when establishing a communication connection with the base station or recovering the communication connection with the base station;

receiving a request from the base station for acquiring the information related to the request failure; and transmitting the information related to the request failure to the base station.

15. The electronic device of claim 14, wherein the notification indicates that the information related to the request failure contains information of the system message which is not acquired based on the request, or the notification indicates that the information related to the request failure contains information of a message which is not acquired based on the request.

16. The electronic device of claim 9, wherein the information related to the request failure is contained in minimized driving test information.

17. A non-transitory computer-readable storage medium having stored thereon a computer program, applied to user equipment, wherein the program when executed by a processor, implements operations of the method for recording information of claim 1.

* * * * *